April 23, 1968     J. H. LANCOR, JR     3,379,488
INFORMATION DISPLAY SYSTEM
Filed Sept. 8, 1965     8 Sheets-Sheet 1
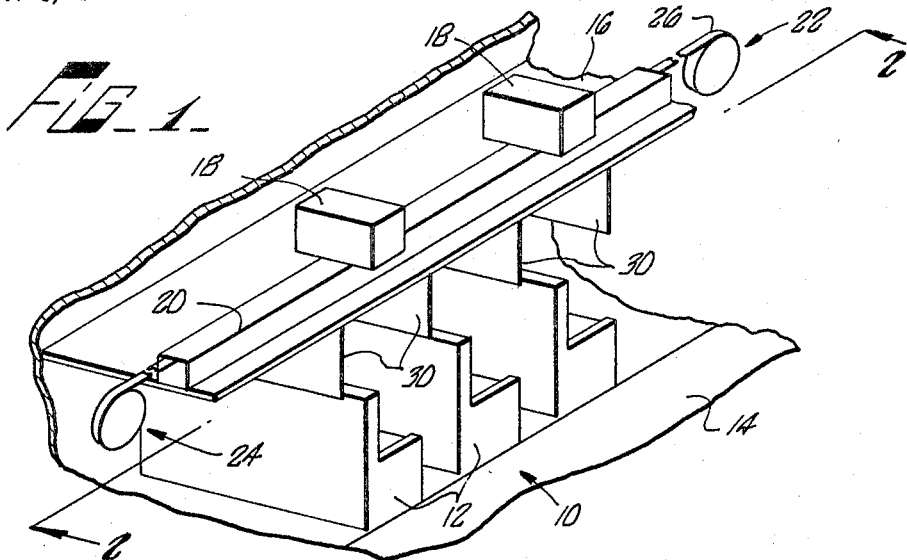
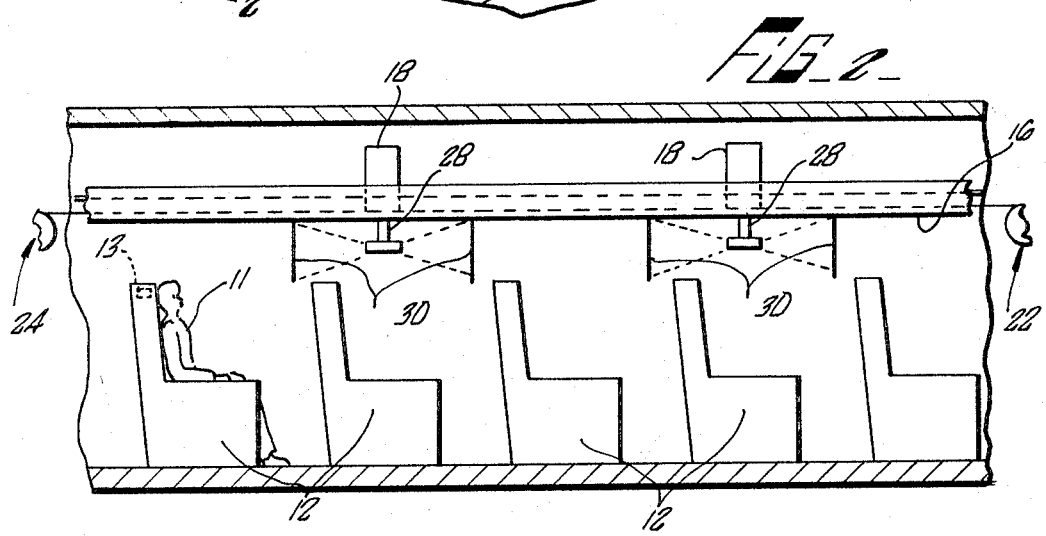
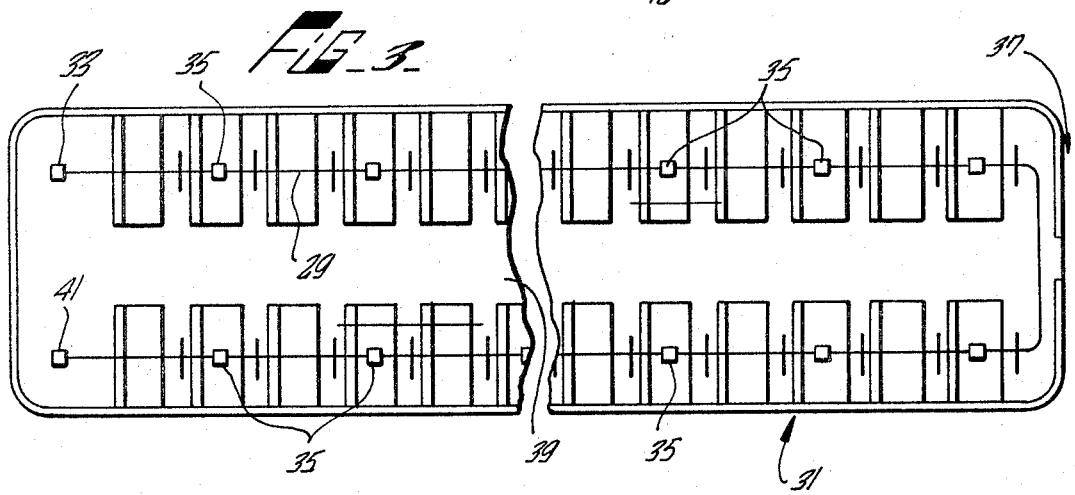

April 23, 1968     J. H. LANCOR, JR     3,379,488

INFORMATION DISPLAY SYSTEM

Filed Sept. 8, 1965     8 Sheets-Sheet 2

INVENTOR.
JOSEPH H. LANCOR, JR.
BY
Christie, Parker & Hale
ATTORNEYS.

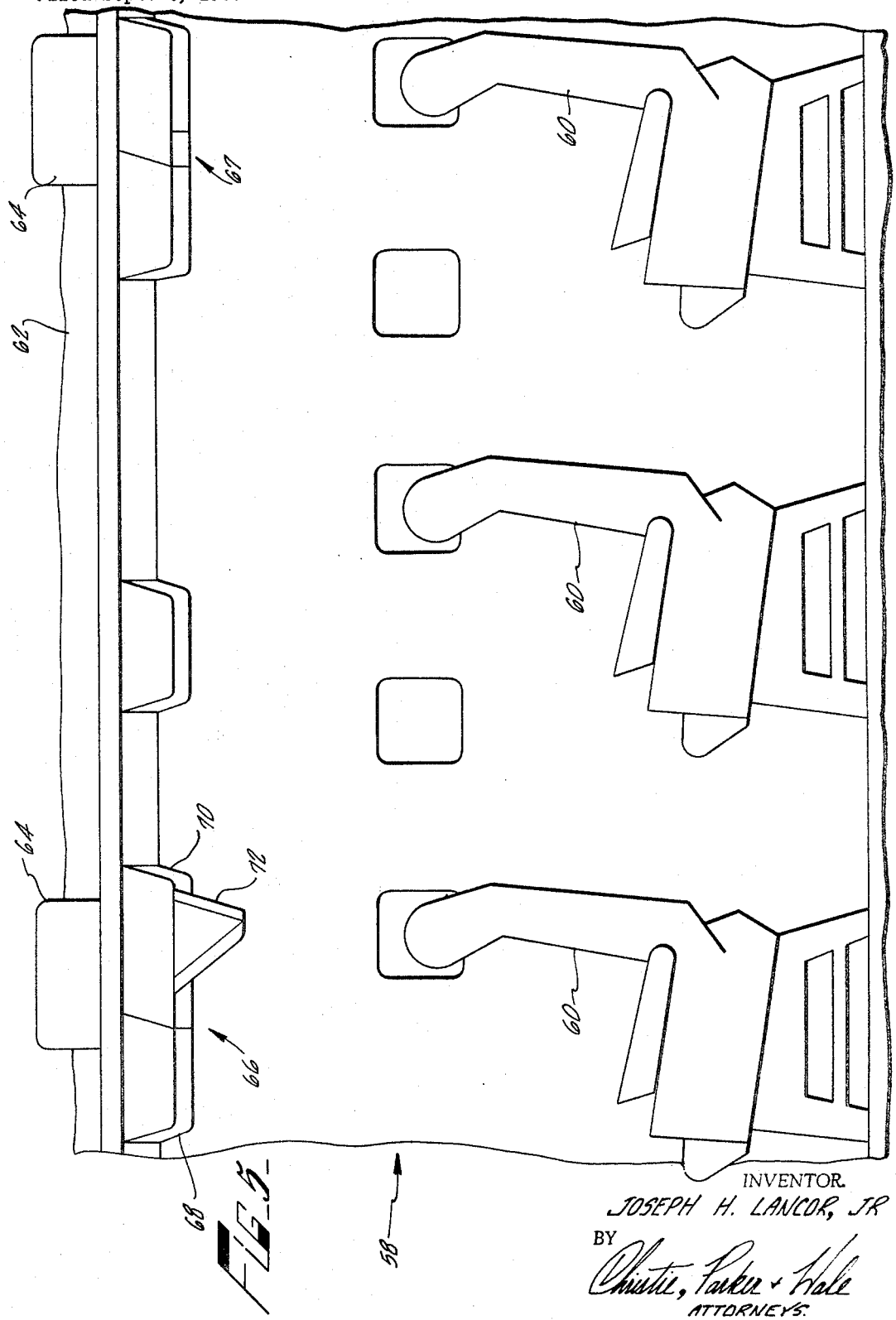

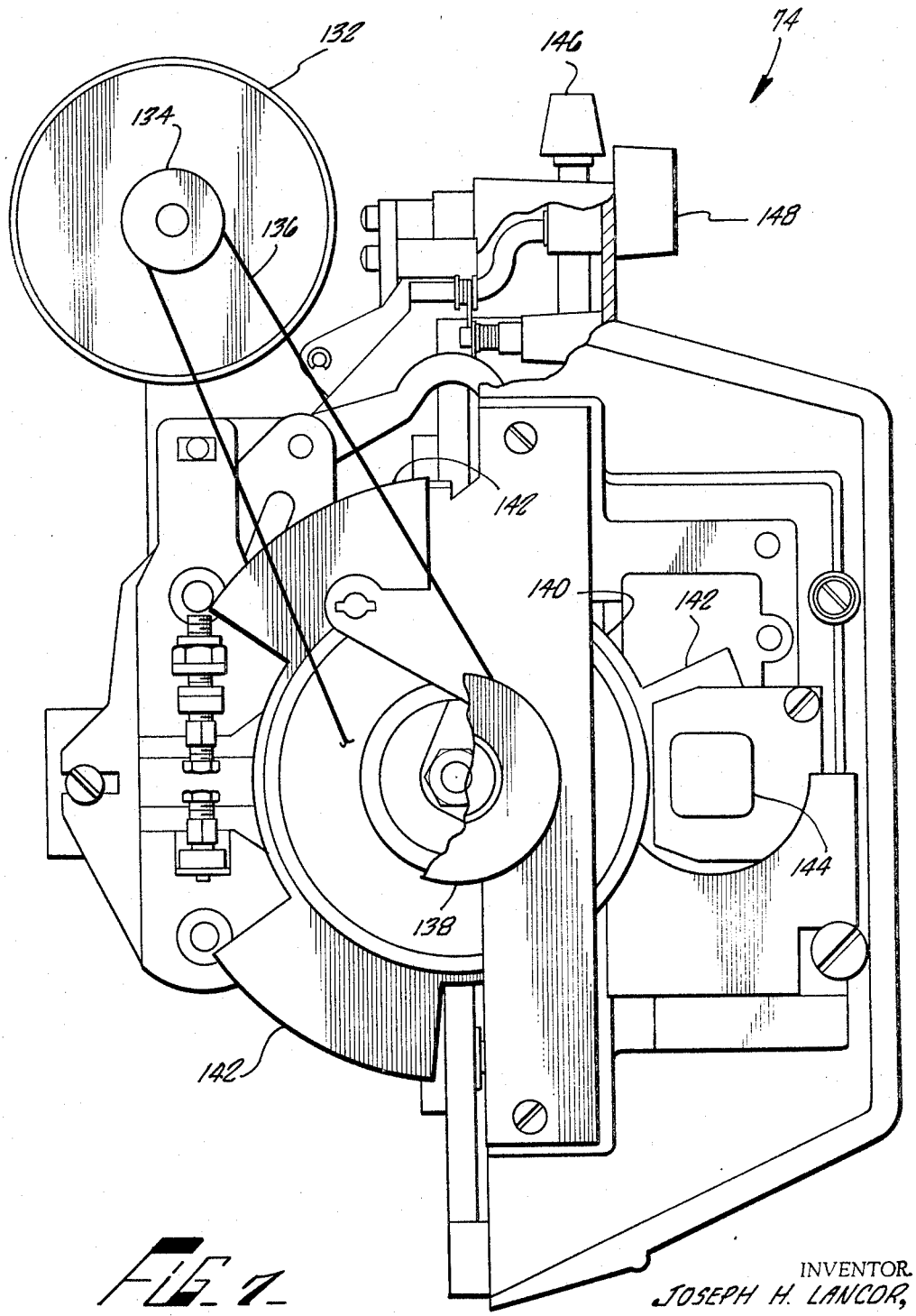

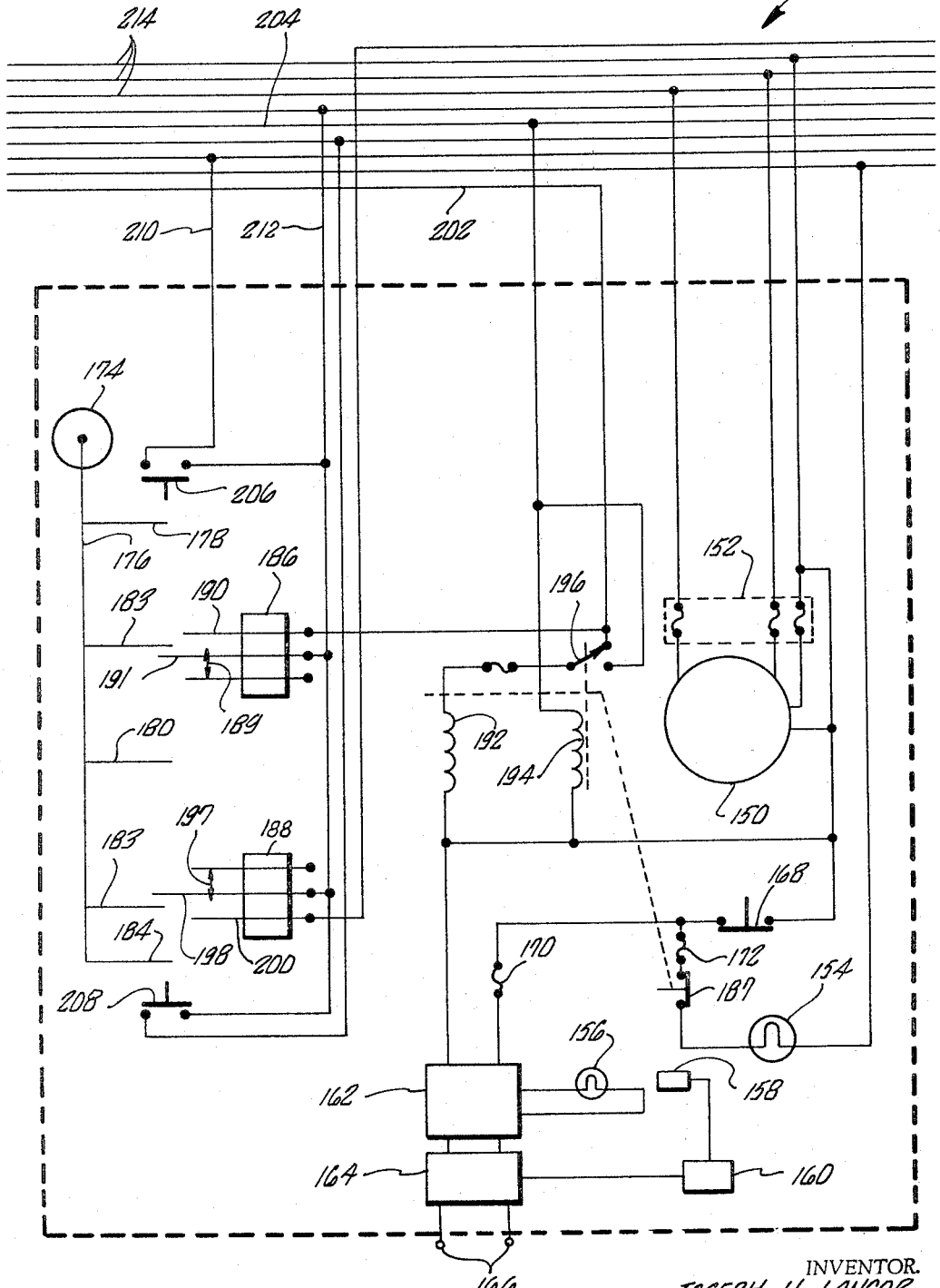

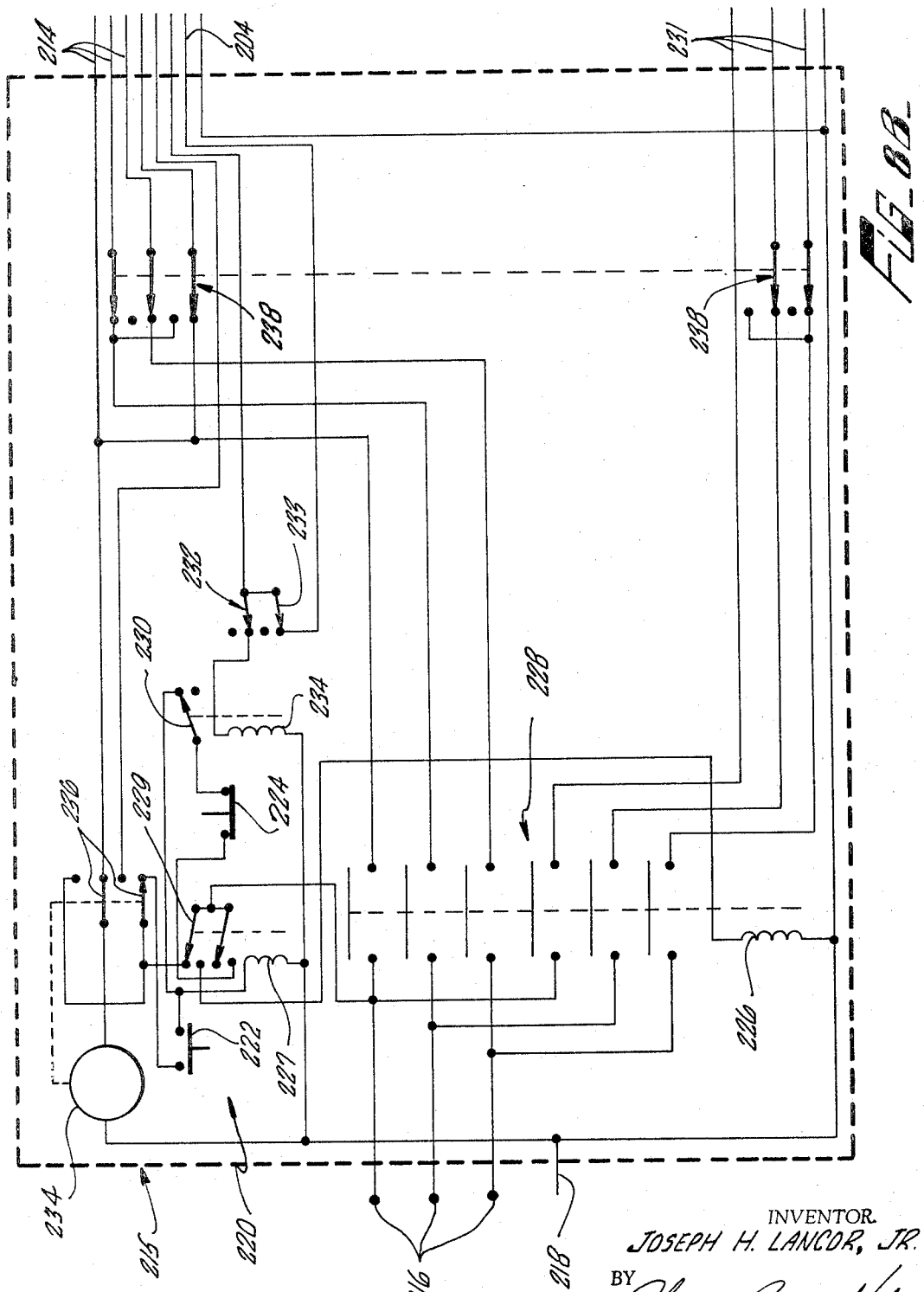

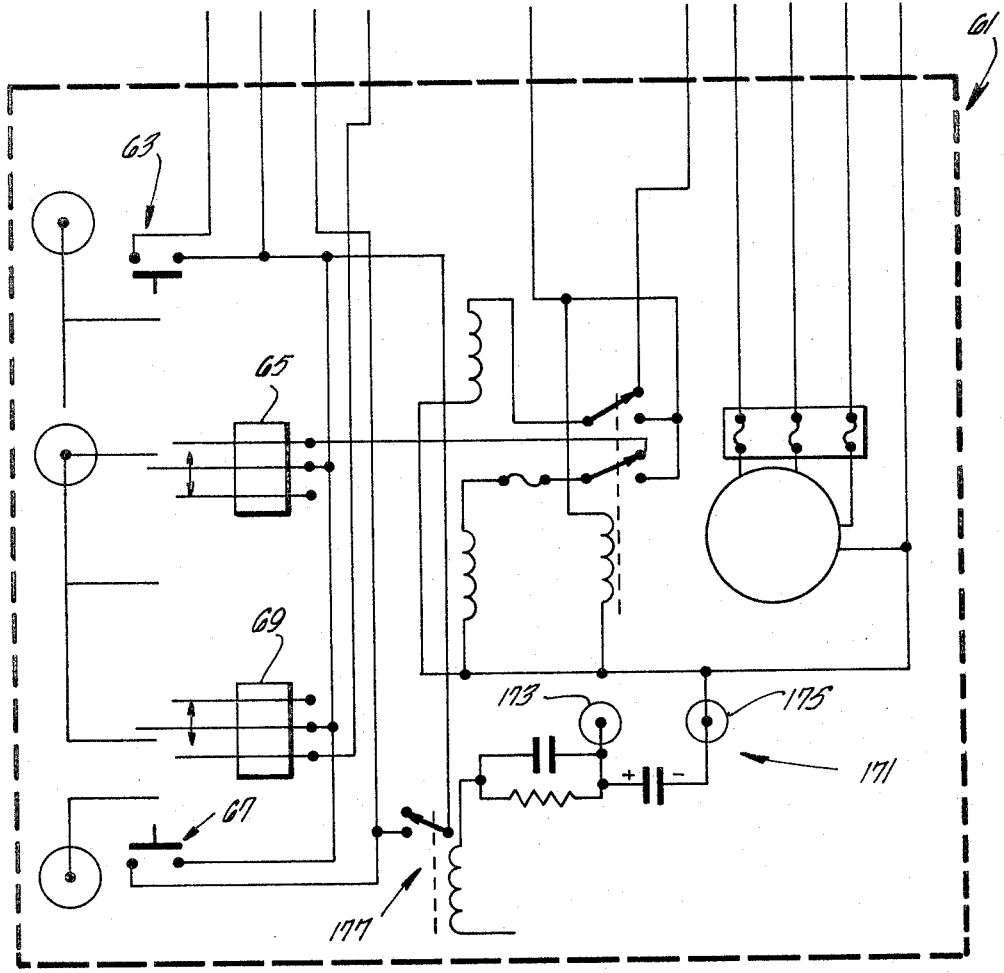
FIG_8C_
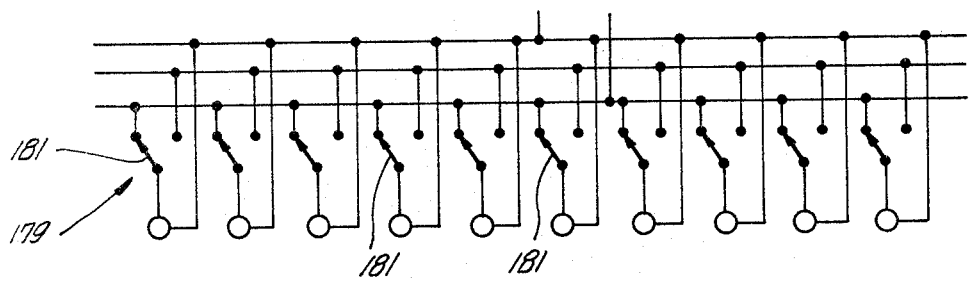
FIG_8D_

April 23, 1968 J. H. LANCOR, JR 3,379,488

INFORMATION DISPLAY SYSTEM

Filed Sept. 8, 1965 8 Sheets-Sheet 8

INVENTOR.
JOSEPH H. LANCOR, JR.

BY Christie, Parker & Hale
ATTORNEYS.

United States Patent Office 3,379,488
Patented Apr. 23, 1968

3,379,488
INFORMATION DISPLAY SYSTEM
Joseph H. Lancor, Jr., Arcadia, Calif., assignor to Consolidated Electrodynamics Corporation, Pasadena, Calif., a corporation of California
Continuation-in-part of application Ser. No. 429,091, Jan. 29, 1965. This application Sept. 8, 1965, Ser. No. 485,768
40 Claims. (Cl. 352—6)

ABSTRACT OF THE DISCLOSURE

Visually displaying information recorded on a film to a plurality of discrete audience units wherein a separate projection screen is associated with each unit and the film is serially directed through a plurality of projectors for projection onto the screens. Sound reproduction can be provided, synchronized for each unit.

---

This is a continuation-in-part of application Ser. No. 429,091, filed Jan. 29, 1965, now U.S. Patent 3,359,058.

This invention relates to information display systems and, in particular, to a film system for providing an audio-visual presentation at a plurality of individual projection stations spaced throughout such areas as the passenger cabins of common carriers, classrooms, and the like.

Among recent developments in air travel has been the introduction of systems for entertaining passengers while in flight. At the present time, the entertainment systems that are being used are basically of two types: the first being a conventional motion picture projection system and the second, a television system using a centrally located video tape reproduction unit and a number of television monitors operating off of the reproduction unit.

It has become evident that the two systems as presently conceived have certain inadequacies. In the motion picture projection type of system, a familiar approach is to use two sets of projectors and screens, one located at the rear of the cabin and the other approximately amidships. This normally corresponds to the division of the cabin into the first-class and tourist sections.

Since the projector is located at a substantial distance from the screen and the projection screen is relatively large, the light intensity on the screen is insufficient for comfortable viewing under normal cabin lighting conditions and the entire airplane cabin must be darkened as in conventional movie theatres. This means that all of the passengers on the plane are, in effect, a "captive" audience. Those passengers who might prefer to read or work rather than view the film because they have already seen it or are simply disinterested are discouraged from doing so.

In addition, the motion picture system currently in widest use is handicapped in that the presentation causes a substantial interruption of normal cabin routine. In addition to darkening the cabin during the time of film presentation, the motion picture screen is suspended in the cabin aisle, hindering the free movement of passengers and aircraft personnel through the cabin.

The use of a single screen and projector in each half of the cabin also means that passenger movement in and out of seats can interrupt the viewing paths between the various passenger seats and the screen. Similarly movement in the aisle can interrupt these same viewing paths as well as the optical path between projector and screen, both interruptions being a source of distraction to passengers viewing the presentation.

Video tape systems as presently constituted represent a possible alternative to the motion picture projection approach. In the typical tape system, a number of receivers are located throughout the passenger cabin. In one arrangement, one black and white receiver is provided for every two seats in the first-class section and one for every six seats in the tourist section. No color presentations are currently available with this type of system. Compared to a motion picture system, such an arrangement is costly and it is precisely the cost of a video tape system that is one of its more serious drawbacks.

In addition, the video tape system involves additional expense in the form of transferring the entertainment subject matter which is normally available on film onto the video tape for reproduction via the monitors. Experience with such systems has also shown that reliability is a problem. Present experience has indicated a "downtime" due to problems in the system in excess of 25% of available show time.

The present invention combines the desirable features of an individualized presentation inherent in the video tape monitor system without the maintenance and other problems encountered in television systems and at the same time eliminates the undesirable features of the current motion picture presentation systems.

The present invention provides a novel system for presenting information recorded on film to a plurality of spatially separated audience units. The system comprises a source of film and a separate projection screen associated with each audience unit and located at spaced intervals corresponding to the spacing of the audience units. A plurality of motion picture projectors are located at spaced intervals related to the spacing of the screens, each projector being positioned to project images onto at least one screen. Means are provided for extracting the film from the source and for directing it from the source serially through the projectors and to a means for gathering the film after it has passed all of the projectors.

The system utilizes the film itself as a media for transporting the information from station to station. In operation, the system provides simultaneous and serial display of the information recorded on the film. The scenes on a specific portion of the film appear at successive stations with a certain lapse of time between displays of the same portion depending upon the distance between successive projectors.

The invention further contemplates a method for displaying information recorded on film to a plurality of spatially separated audience units. The method comprises the steps of providing the film at a supply position and threading the film from the supply serially through each of a plurality of display stations located at spaced intervals corresponding to the spacing of the audience units to a take-up position. The film is withdrawn from a supply position and driven through the plurality of display stations and to the take-up position after it has passed the last station. As the film is driven from the supply to the take-up position, the plurality of display stations are selectively energized to provide a simultaneous and serial display of the information recorded on the film as it passes through the energized stations.

In contrast with conventional motion picture projection systems, the present system locates projectors and display apparatus relative to each other such that there is sufficient brightness on the display apparatus to be observed in comfort under normal lighting conditions. In addition, the system is capable of providing presentations in color and can accommodate both normal or wide screen presentations. The ability to break the potential audience down from one large group to a number of smaller groups and ultimately to single individuals if desired means a considerable flexibility in travel or instructional situations. Moreover, the system is capable of being arranged such that a plurality of film strips can be simultaneously guided through the system with the option being given to each of the audience units of selecting from the plurality of subject matter presented by these films. In such an embodiment of the system, an optical intermittence or rotating prism type of projector is most suitable since such projectors are readily capable of having the projector lens slid on tracks or other guide means such that they are centered over the particular film to be projected onto the screen.

In the embodiment specifically adapted to multipassenger airplane cabins, the system has several significant advantages over the present systems in that normal cabin routine is not affected. By virtue of using screens in close spatial relationship with individual projectors located at spaced intervals within the cabin, the intensity of projection on the individual screens is sufficiently bright that normal cabin lighting can be maintained. Because there is a plurality of presentations, viewing positions can be located relatively closely to the projection screen enabling the use of smaller screens, which are suspended from overhead baggage racks. This means no aisle obstructions.

The provision of a plurality of viewing screens within the cabin gives each passenger a choice in deciding whether or not to view the presentation. Passengers not wishing to view the presentation can turn off the unit housing their projection screen. By means of an interlock in the screen housing, the projection lamp circuit in the projector associated with those seats is opened. The film then passes through the projector associated with their seats in its transit through the system without a presentation at that particular location.

The system is provided with means for synchronizing the sound reproduction with either of two projection screens, the one normally associated with a particular seat and the one forward of the normally viewed screen. Means are also provided for by-passing an individual projector such that the system may continue to operate though one or more individual stations have failed. Film drive is provided by synchronous electrical motors for driving the individual projectors, thereby providing relatively constant tension on the film. A servo-control system using constant tension springs and limit switches further assures maintenance of constant film tension and safeguards against film breakage.

These and other features of the system will become more apparent by reference to the following detailed description and accompanying figures in which:

FIG. 1 is a perspective view of a telescoped embodiment of the system of this invention;

FIG. 2 is a section view taken along lines 2—2 of FIG. 1 showing the detailed relationship of projectors, screens, and viewing locations;

FIG. 3 is a schematic diagram of one embodiment of the system of the invention showing the relation of supply and take-up positions and projection stations;

FIG. 5 is a side elevation of two projection stations and a plurality of seats associated with the stations;

FIG. 7 is a view along lines 7—7 of FIG. 6;

Figure 9:
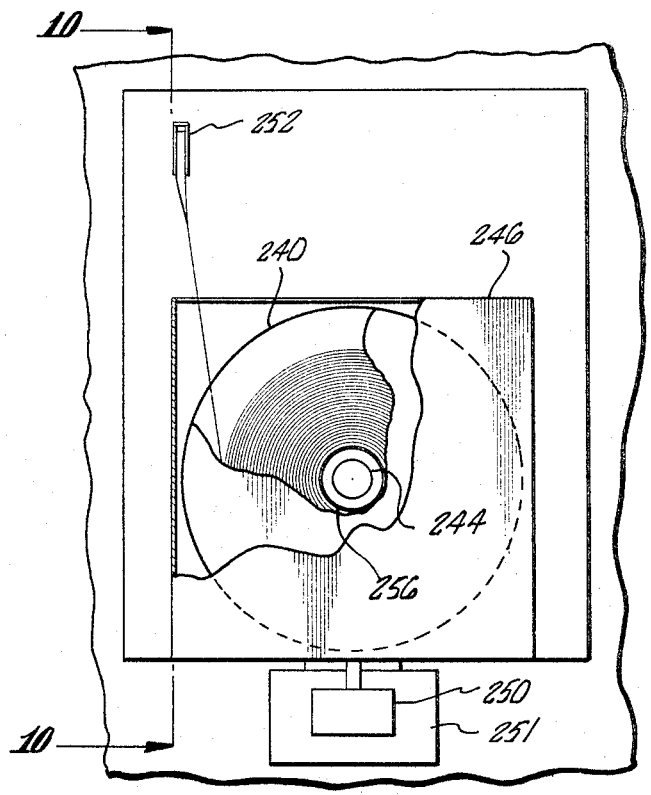
Figure 10:
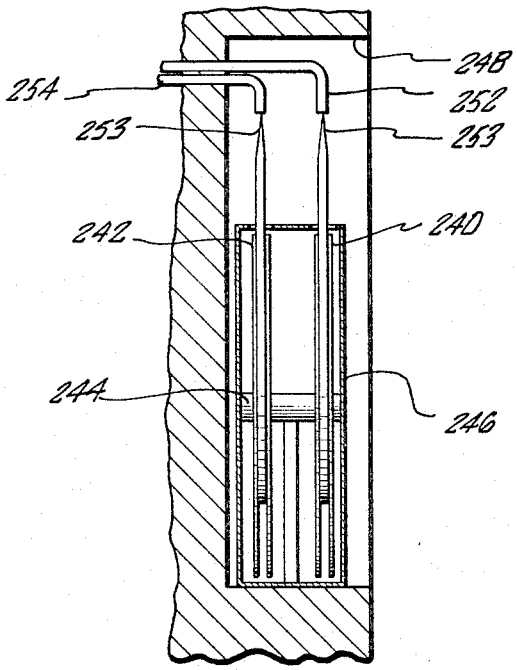

FIGS. 8A, 8B, 8C, and 8D are schematic diagrams of the system electrical control;

FIG. 9 is a front elevation of a container for the film supply and take-up reels mounted in position for use with the system; and FIG. 10 is a view along lines 10—10 of FIG. 9.

Referring now to FIGS. 1 and 2, there is shown an enclosure 10 wherein a number of the viewing locations 12 are provided along an aisle 14. Above the seats is a shelf 16 and provided on the shelf are a plurality of motion picture projectors 18 located transversely of a guide 20. A supply reel 22 and a take-up reel 24 are located at opposite ends of the guide 20 and a length of film 26 extends between the two reels. Motion picture projection screens 30 suspended from the shelf are disposed before each of the viewing locations 12. As film is transported through each projector the screens receive the information projected and directed by suitable optical means onto the screens. Drive means (not shown) are provided in conjunction with the supply and take-up reels and the projectors for causing the film to move serially from the supply reel past the various projectors in the system to the take-up reel. A centrally located drive motor and flexible drive shaft extending from the motor through the system is suitable for accomplishing the function of film movement.

In contrast with video tape systems wherein the information is transmitted electrically to each of the display stations, the present invention uses the film itself as the transmission line. Whereas video tape systems use high-speed electrical transmission between stations, the present transmission line is characterized by a relatively low velocity of propogation. Here the visual information is delivered to each desired location by the continuous physical transfer of film to individual projectors where the images recorded on the film are picked up and projected to screens associated with the projector.

As shown in FIG. 2, the specific embodiment of the system shown therein utilizes projectors 18 which are capable of front lighting and back lighting a pair of screens 30 thereby illuminating two screens with a single projector. Such a function is accomplished by the use of a beam splitter 28 which receives the images projected from the film by the projector 18 and by optical means well known in the art directs the images both fore and aft such that two screens are illuminated by one projector.

The system shown in FIGS. 1 and 2 is an adaptation of the invention to use in an enclosure such as the passenger enclosure in a typical common carrier. While it is contemplated that the invention will have its widest application in such environments, the system is adaptable to any situation where it is desired to provide discrete spatially separated readout of information recorded on film to audience units scattered throughout a given area. As used herein, an audience unit includes one or more viewers disposed at a specific location in the area served by the system. In the embodiment shown in FIGS. 1 and 2 another system running parallel to that shown in the figures is provided for the passenger seating area located on the opposite side of the aisle 14.

A single strand of film extending between the supply and take-up reel is depicted in FIGS. 1 and 2. The system is also adaptable to the use of multiple parallel films. In one embodiment the films are simultaneously extracted from supply reels and guided through the guide means to the take-up reels. By the use of suitable apertures on the projectors 18 and by proper design of the projectors, the projectors can be made to move transversely of the guide means such that the projection light is directed through the selected one of the choice of films offered. It is contemplated that projectors operating on the optical intermittence principle are most adaptable to the multiple film embodiment.

Sound reproduction is provided either as part of the projectors 18 or as a separate mechanism for scanning the sound track recorded on the film and transmitting the detected recording to headsets 13 associated with the various viewing locations within the enclosure. The sound head can be an optical or magnetic detector depending on the type of recording provided with the film. Sound is provided on an individual basis by transmitting the detected sound track from the sound head to each individual viewer 11. As shown in FIG. 2 a small magnetic speaker 13 located in the viewers headrest is provided for transmitting sound to the viewer in that seat. Conventional earphones can also be provided to convey the audio portion of the presentation to the viewer.

In still another embodiment the sound recording accompanying the filmed presentation is provided on a separate medium such as magnetic tape. A playback mechanism for reproducing the recording on the separate medium is then located at some central location in the viewing area and associated therewith is a closed loop tape recorder having a tape path of a predetermined length proportional to the length of the projection system. The sound track reproduced by the playback mechanism is recorded on the closed loop tape and subsequently picked up by magnetic reproduce heads located at spaced intervals along the closed loop tape path to produce sound in synchronism with the visual readout at each projection station.

In other embodiments, the film guide is located in the center of a passenger enclosure above the aisle which normally runs through the middle of the enclosure. Where such a variation is employed, the projectors are arranged to project to each side of the enclosure to provide displays above the seating locations. In still another embodiment the film guide is located beneath the floor of the enclosure and is provided with a suitable optical system for projecting the images on the film from below the floor to screens disposed at suitable viewing locations.

As contemplated by this invention the supply reel discharges its film into an enclosed duct through which the film travels. The advantage of providing en enclosed duct is that by this means the film is protected throughout its transit from supply to take-up, is kept clean, and is prevented from becoming tangled. The use of an enclosed duct lends itself readily to the use of air pressure within the duct for loading the film in the system. An alternate means of loading would be to exhaust the duct and to employ the partial vacuum generated therein to load the film.

A system diagram of the embodiment shown in FIGS. 1 and 2 is depicted in FIG. 3. In this diagram the film 29 is looped around an enclosure 31 in which the showing of the film is to be made. From supply reel 33, the film passes through projection stations 35 to the end of the enclosure 37 opposite the supply reel. By suitable guide means, the film is directed across the aisle 39 and turned toward the take-up reel 41 which is located adjacent supply reel 33 on the opposite side of the aisle. After passing through the second series of projection stations the film is gathered on the take-up reel. The advantage of such a variation is that only a single copy of each film presentation is needed to traverse the entire area in which the information is to be displayed.

To provide accessibility for servicing and adjustment, the projectors are oriented such that their controls are accessible from the aisle. To accomplish this the projectors on one side of the aisle face the rear of the enclosure. This means that in the embodiment shown in FIG. 3, the individual frames on the film on the return leg of the film path are turned 180° relative to their orientation on the departing leg. To prevent projection of an image which is upside down, suitable optical arrangements are provided in connection with the projectors associated with the return leg of the film path such that an upright, right reading image is projected on the screens. Optical means such as a conventional relay lens or prism for handing the image are suitable in such an application. For example, the image may be passed through a pentaprism with three reflecting surfaces as are used in modern miniature reflex cameras and which turn an image upright as well as right-way-round (see, in this regard, the "Focal Encyclopedia of Photography," 1957, published by the MacMillan Company, New York, particularly pages 914, 915, 959 and 960).

Figure 4:
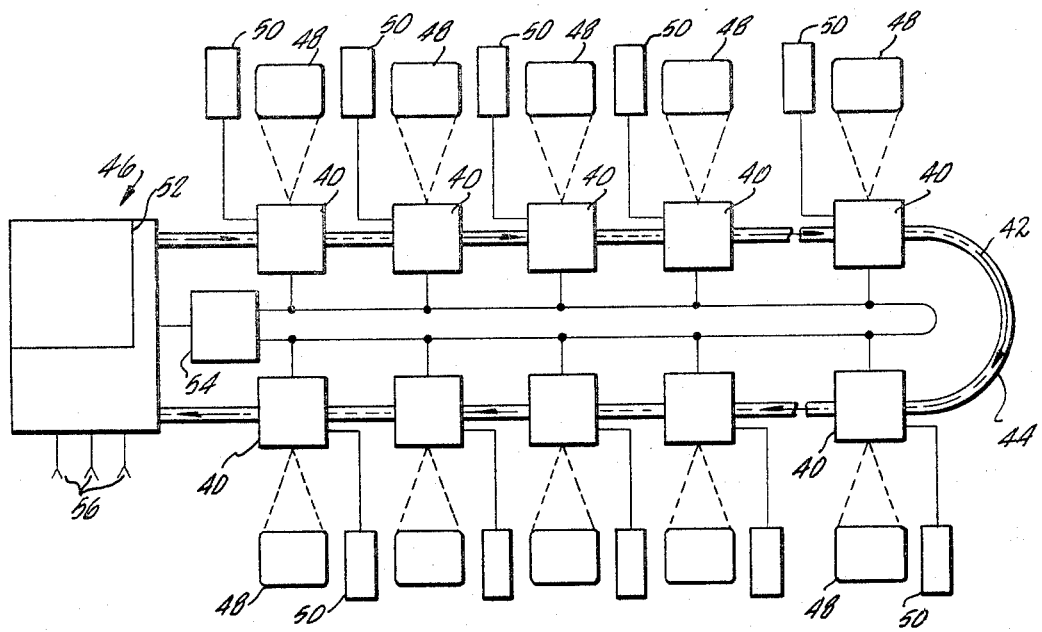
FIG. 4 is a block diagram of an embodiment of the system in airplane cabins.

An adaptation of the system of this invention to the cabin of the typical multi-passenger airplane is shown in FIG. 4. In that figure, the system comprises a number of projection stations 40 which are located at spaced intervals within the passenger enclosure. Projectors in each of those stations are interconnected by an enclosed guide means 44 through which the film is adapted to be directed. Shown dotted within the guide means is a retained trailer 42 and arrows indicating direction of film travel through the system. As will be described in more detail in conjunction with the description of the supply and the take-up station 46, the preferred embodiment of the film supply reels to be used with this system have a length of film wound interiorly of the motion picture subject matter, i.e., connected at the tail end thereof, such that as the end of the film transverses the system, it extracts the trailer from the reel and threads it through each of the projectors and back to the take-up reel. By suitable sensing means at the take-up position, the system senses the end of the film and turns the system off, leaving the trailer 44 stored in the system. When a new film is installed at station 46, the film is attached to the trailer which was left in the system and the system is ready to resume operation.

As shown in the specific embodiment of FIG. 4, each projector 40 is adapted to project images recorded on the film to a number of motion picture projection screens 48, the number of screens being the same as the number of projectors. Also provided in conjunction with each of the projectors is an audio pickup 50, the number of pickups also being the same as the number of projectors and screens. The audio pickup is arranged to be connected to the headsets or speakers associated with each of the viewing screens.

The film to be supplied to the system is provided by means of a container 52 which is mounted at a supply position 46. As used in this system, the container is provided with a supply reel containing film to be transported through the system and a take-up reel for gathering the film after it has passed the projectors in the system. A system control 54 is connected to each of the projectors 40 and to the supply and take-up container 52. It is the function of this system to sense the tension on the film and to cause one or more of the projectors in the system to idle in the event tension on the film becomes too great or too small, thereby preventing jamming of the system or breakage of the film. Power for the system is provided by terminals 56 for interconnecting the system to the A.C. service supply on the aircraft.

A section of the cabin showing the spatial interrelation of the projection screens in the system is shown in FIG. 5. The section shown corresponds to a portion of the first class compartment of a typical aircraft. Located in an overhead baggage rack 62 above a number of passenger seats 60 are housings 64 for two of the projectors for this system. Attached to the underside of the rack at intervals corresponding to every other row of seats are two service units 66 and 67. The normal equipment which is provided above each of the seats in the aircraft is located in the front half 68 of unit 66. These include an oxygen mask, lights, call button, etc. In the second half 70 of service unit 66 is provided a housing for the retractable projection screen to be used with this system. The screen is adapted to be folded such that it can be swung up into a surface flush with the front half 68 of the service unit. A screen 72 is shown in the extended position in service unit 66. Service unit 67 depicts the closed position.

In one embodiment of the system the length of the optical path from projection lamp to screen is seventeen inches. The use of relatively small screens located in close spatial relation to the projectors means that the projection lamp in each of the projectors can be of relatively low power and still generate sufficient intensity to project an image with sufficient brightness to be viewed in comfort under normal cabin lighting conditions.

Figure 6:
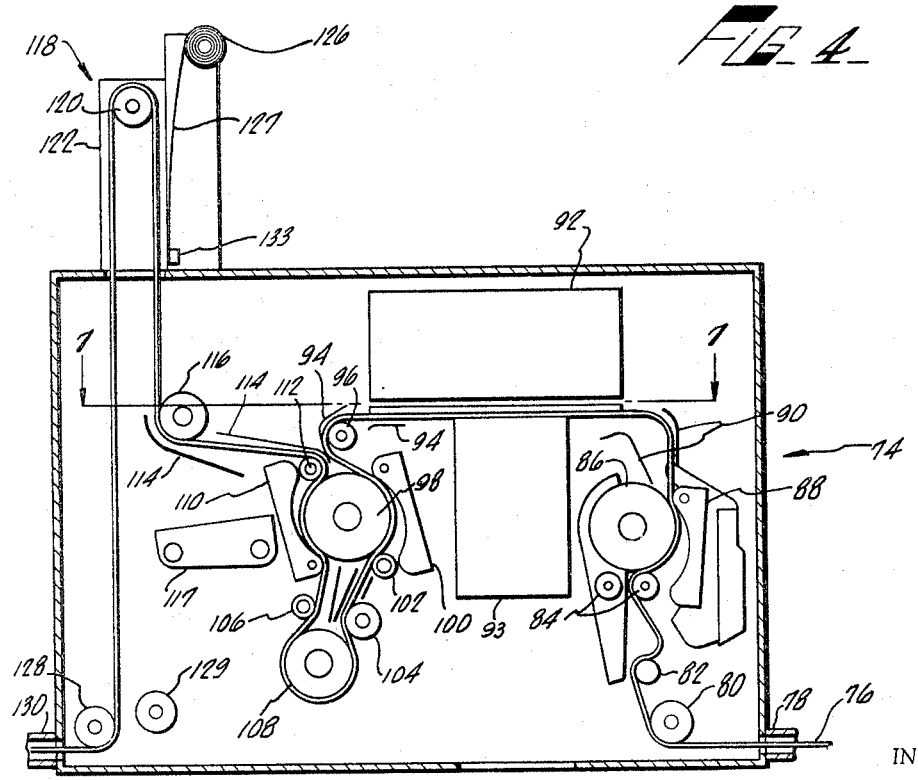
FIG. 6 is a front sectional elevation of an individual projector and associated film tensioning means.

The motion picture projectors to be used with this system are automatic threading projectors such as the Bell and Howell Co. 16 millimeter motion picture projector model 552A. Such projectors are of the "pull down" type, i.e., they operate on a mechanical intermittence principle. A section view of such a projector 74 is shown in FIG. 6. As shown therein a length of film 76 passes from a guide 78 into the interior of the projector. The film passes around a roller 80 and into the projector mechanism proper. From roller 82, the film passes between guide rollers 84 and between a feed sprocket 86 and a sprocket guard 88. The film then passes between film guides 90 and subsequently between a projector lamp housing 92 and a projector lens 93. From the lens 93, it moves between guides 94, around guide roller 96 and between sprocket wheel 98 and sprocket guard 100.

The film is then guided by means of rollers 102, 104, and 106 around an optical sound head 108 and moves between sprocket 98 and a sprocket guard 110 toward the projector exit. After passing over the sprocket wheel 98 the film passes around guide roller 112, between film guides 114, and around guide roller 116 to a loop forming means 118 comprising a roller 120 mounted on sliding support 122. A lever 117 is provided for mechanically adjusting the projector for manual or automatic loading. The film extends from roller 120 around exit roller 128 into guide 130 for passage to the next projection station.

The loop forming means 118 is shown in its normal operating position intermediate positions of extreme travel. The roller is held in this position by means of a constant tension spring 126 which is balanced against film tension. An extension 127 from the spring is attached to support 122 at 133. In the event a malfunction occurs in either projector 74 with which the loop-forming means is associated or in the next succeeding projector, the tension on the film increases or decreases depending on the location of the malfunction. By providing suitable limit switches (see FIG. 8A) which are actuated as the loop-forming roller 120 rises or falls above a predetermined position, projector 74 or the next succeeding projector is put into a still mode, i.e., it temporarily ceases feeding film to permit the loop-forming means to return to its normal position.

A feature of certain motion picture projectors currently available is the capability of stopping the projector (putting it in the "still" mode) on a certain frame for detailed viewing and subsequently resuming normal operation (putting the projector back into the "run" mode). This is accomplished by operating, a control on the projector which in turn engages a clutch and disconnects the projector drive means from the drive train. The "still-run" capability of these projectors is especially helpful in the present system because it allows certain projectors to temporarily stop feeding film in the event of a change in film tension while the remainder of the projectors continue to operate to obtain restoration of normal film tension.

The effect of the loop-forming means is as follows. Assuming an increase in film tension and consequent depression of a loop-forming means, a signal is transmitted to the next succeeding projector in the system putting that projector in the "still" mode while the projector associated with the loop-forming means continues to feed. Continued feeding of film allows the loop-forming roller to rise removing the signal from the succeeding projector and permitting it to resume operation.

If the tension on the loop forming means decreases (normally meaning the next succeeding projector is not feeding properly) the loop forming means rises and puts the projector with which it is associated in the "still" mode. This allows the next succeeding projector to take up the slack (assuming that that projector is operating) thereby increasing tension on the film and allowing the stilled projector to resume operation.

If a complete stoppage of the system occurs due to a jammed projector, an inspection of the position of the loop forming means will serve to pinpoint the trouble. The jammed projector will normally be the one succeeding the last projector having a loop forming means positioned at its upper limit.

To initially load the projector, film from the supply point is passed through the enclosed guide means to the first projector. The film is fed into the projector between rollers 84 until it engages sprocket 86. With lever 117 in the automatic threading position the loop forming means 118 is manually depressed to the normal operating position energizing the station and causing the film to be threaded through the projector. When a sufficient length of film has emerged from the projector, it is guided around the loop forming means 118 and roller 128 into guide 130. The system is again energized to pass the film in the guide to the next projector. The projector can also be manually loaded if necessary.

In the event of malfunction or jamming of a particular projector, the film can be manually removed from that projector and guided around roller 129 to bypass the projector. The system operation then proceeds in the normal manner with one station disabled. As will be discussed in more detail below, switching means are also provided with the viewers headsets to enable the viewers to switch to the sound pickup at the projection station immediately forward of the disabled projector.

The loop forming means of FIG. 6 and attendant circuitry shown in FIG. 8 illustrate one servo method of sensing and correcting film tension. Other methods may also be employed. One such alternate method is to provide a column similar to vacuum columns used in magnetic tape transports for buffering mechanical nonlinearities. By means of light and photocell combinations the position of a loop of film in the column can be detected. Elongation or shortening of the loop breaks the light beam and actuates suitable controls for putting one or all of the projectors into the still mode or for interrupting power to the system to prevent film breakage and permit corrective action.

FIG. 7, a section view along line 7—7 of FIG. 6, depicts the relationship of drive means 132 to each projector 74. In the present system the drive means 132 are hysteresis synchronous electrical motors designed to operate off three phase 400-cycle A.C. power provided as part of the electrical service system of the aircraft. A drive pulley 134 is connected by a belt 136 to a driven pulley 138 on the projector. In addition to providing the drive for propelling the film through the system, the drive means also turns shutter wheel 140 which is provided with three shutters 142 around its periphery. The film is drawn over projection window 144. Light from the projector lamp is periodically cut off by shutters 142 according to conventional motion picture projector operation. A framing knob 146 is provided for centering the projector aperture on the frames of the film to be used with the system. Also provided is a focusing knob 148 for controlling the focus of the projection lens. A clutch provided as part of projector 74 disconnects the drive train of the projector from pulley 138 when it is desired to put the projector in the still mode.

The electrical control system for a typical projector 151 in the system is illustrated by the schematic of FIG. 8A. In that figure, a synchronous drive motor 150 is connected to the three-phase 400-cycle supply through a fuse box 152 and leads 214. With the exception of the reel station, the schematic of FIG. 8A represents control wiring for each of the projector stations.

The projector is provided with a projection lamp 154 for producing the light for projecting images on the film toward the screen. An exciter lamp 156 produces the illumination necessary for detecting the sound track recorded on the film. The light from lamp 156 is picked up by a photosensitive cell 158, the output of which is connected to a preamplifier 160. The exciter lamp is energized by a D.C. power supply 162 which also provides power for a power amplifier 164 which is connected to receive the output from the preamplifier. The power amplifier connects to a pair of jacks 166 for transmitting the sound portion of the presentation to a plurality of speakers or headsets associated with this particular projection station. An interlock switch 168 operated by the opening of the projection screen housing closes the circuit between one line of the 400-cycle supply and the projection and the excitor lamp circuits. This portion of the circuit is protected by suitable fusing at 170 and 172. The sound distribution system is also interconnectable with auxiliary sound reproduction means for providing music, etc. to the passengers.

The loop forming means is represented by a roller 174 mounted on a slider arm 176. The slider arm is provided with three extensions or cams 178, 180 and 184. The loop forming roller and slider arm 176 are shown in their normal operation position. This places extension 180 between switches 186 and 188. When film tension is relaxed, as, for example, when a malfunction occurs in the projector next following projector 151, roller 174 rises and a toggle switch 186 is operated by physical contact between extension 180 and switch arm 191. This causes the switch armature 189 to make contact with switch contact 190 thereby closing a circuit through a solenoid 192, disengaging a clutch on motor 150, and placing projector 151 in the still mode.

In the same manner an increase in tension on the film causes roller 174 to be depressed thereby causing contact to be made between extension 180 and the switch arm 198 on toggle switch 188 causing the armature 197 to make contact with switch contact 200 thereby completing a circuit through a relay coil (not shown) of the next succeeding projector. Such a relay coil corresponds to coil 194 on projector 151. Each projector station is provided with a similar connection to the next succeeding projector. From the projector preceding projector 151, this connection is made via lead 204. Energization of relay coil 194 operates relay 196, energizes solenoid 192, and again places the projector in the still mode.

When slider 176 and roller 174 return to the normal operating position, auxiliary extensions or cams 183 from arm 176 reset the toggle switches 186 and 188 preparatory to the next occurrence of abnormal film tension.

Projector 151 is also provided with limit switches 206 and 208 located at the top and bottom of the travel of slider arm 176. If cam 180 on slider arm 176 rises past the switch 186, for example, when the film breaks, the upper extension or end 178 of slider 176 contacts switch 206 closing a circuit through leads 210 and 212 to a relay in the master control panel which automatically opens the circuit supplying power to the entire system causing the system to be shut down.

The lower limit switch 208 has a similar function. If film tension continues to increase after cam 180 has operated switch 188 causing the slider arm 176 to be depressed further, contact is made between the end 184 of the slider arm and switch 208 again closing a circuit through a relay in the master control panel and causing the circuit providing power to the system over leads 214 to be cut off.

The synchronous motors together with the loop forming means (also referred to herein as the film tensioning control or function control) provide means for maintaining proper film tension during operation and automatic shut-off in the event of serious malfunction.

In the event of energization of solenoid 192 an auxiliary contact 187 in the projection lamp circuit is opened cutting off power to the lamp. This prevents the lamp from burning the film during those intervals when the projector is not feeding film.

The schematic of the master control panel is shown in FIG. 8B. In this figure the three-phase 400-cycle power is supplied at terminals 216. Terminal 218 is a neutral or ground terminal for the system. The master control switch 220 is provided with an "on" switch 222 and an "off" switch 224. A power relay coil 226 and a six contact double-pole power relay 228 is provided for supplying power over leads 14 to half of the projectors in the system and over leads 231 to the remainder of the projectors in the system.

In the preferred embodiment of the system, the leads 214 and 231 connect power to the projectors located on each side of the aisle respectively. Closure of switch 222 causes current flow through a relay coil 227 causing relay 229 to operate. Operation of relay 229 closes a circuit through power relay coil 226 causing the power relay contacts to close. Closure of relay 229 also completes a circuit through switch 224 and relay 230 through coil 227 causing relay 229 to be held in the operated condition. As long as relay 229 is operated, power is supplied to the system and when the film tensioning controls are in normal operating position all projectors are operated. Operation of "off" switch 224 interrupts the circuits through relay coils 226 and 227 causing relay 228 to release, disconnecting power from the system and causing it to shut down. Switches 232 and 233 are provided to enable and disable the limit switches in each of the projectors of the system. During normal operation they are in the position shown in FIG. 8B. Operation of switch 232 to its other position disables both top and bottom limit switches on the various projectors. Operation of switch 233 disables only the top limit switches. Disabling of the limit switches is frequently useful during initial film installation and during subsequent servicing of the system.

The effect of operation of the top or bottom limit switches on any one of the projectors can best be seen from FIG. 8B. Assuming switches 232 and 233 in the positions shown, operation of a limit switch causes current flow through the relay coil 234 causing relay 230 to be operated. Operation of relay 230 opens the circuit through relay coil 227 and causes relay 229 to release. Release of relay 229 causes relay 228 to release and power is disconnected from the system until the limit switches are reopened. The system can also be shut off manually by operation of switch 224.

When either switch 224 or the limit switches are operated and relay 229 releases, a circuit is completed to a time delay device such as clock motor 234. The function of the clock motor is to operate switch 236 completing a circuit to operate all the still solenoids in the system throwing all projectors into the still or free-running mode for a short time interval. This permits the synchronous drive motors to stop at their own individual rate of speed when power to the system is shut off without affecting the tension on the film at any point in the system. The clock motor holds the solenoids in the operated condition for a predetermined amount of time, on the order of five seconds, by means of a rotating cam. At the end of the cam travel switch 236 returns to the position shown in FIG. 8B. The next closure of the power circuit resets the clock motor and switch 236.

A switch 238 is also provided. The purpose of this switch is to reverse two of the three phases to obtain reverse rotation of the synchronous motors provided with the system. This switch is used when it is desired to cause the film to be backed out of the system rather than pulled through it. This control would be actuated in servicing operations or when film breakage occurs. In this way the system is cleared by backing the film out rather than requiring it to run all the way through the system.

The schematic of FIG. 8C depicts the electrical controls and interconnections provided in conjunction with a supply and take-up station 61 provided in the system. The configuration of this station is similar to the projection stations with several variations. Both the supply and take-up reel are provided with two independent controls, a supply reel limit switch 63, a supply reel film tension control 65, a take-up limit switch 67 and a take-up film tension control 69. The loop forming means for operating the tension sensing controls are located between the sprocket drive and the first and last projection station.

Limit switches 63 and 67 control the system in the same way as the limit switches on the projectors. Providing the switches are enabled, operation of either of these switches shuts the system down. Operation of the tension controls operates the still solenoid in the first or last projector in the system, engages a clutch and puts the projector into the free-running mode.

The reel station is also provided with an end-of-film sensor 171. In one embodiment a metal strap or aluminized foil is provided in the area of the splice between the end of the film and the retained trailer. Contact of this strap with contacts 173 and 175 provided in the reel station completes a circuit to ground energizing relay 177 and automatically shutting the system off.

FIG. 8D depicts an array 179 of speakers of headsets connected to the audio amplifiers associated with each projector station. Each amplifier is capable of driving up to 18 individual headsets. A switch 181 is provided with each individual headset for connecting the headset to the preceding projection station. This enables viewers at a disabled station to switch to a station immediately forward of their station to obtain synchronization of the sound with the presentation viewed. As indicaed in conjuncion with the description of FIG. 6, each station is also provided with means for bypassing the station in the event of malfunction so as to not interrupt overall system operation.

The supply and take-up station for the system is shown in FIGS. 9 and 10. As shown therein a supply reel 240 and a take-up reel 242 are mounted on an axle 244 within a container 246. A receptacle or indented opening 248 is provided in the forward area of the airplane within the bulkhead separating the pilot and passenger compartments. Associated with the container receptacle is a motor 250 and the reel station control system 251. The electrical system of the reel station is shown in FIG. 8C. The motor 250 supplies the power to drive the reels. The film 253 extends from reel 240 through duct 252 to the first projector in the system. The last projector in the system is connected by duct 254 to the reel station and the film is drawn from the duct onto take-up reel 242. The reels are adapted to be of several sizes up to 30 inches in diameter. The large reel is capable of carrying a complete full length motion picture presentation. Provided interiorly of the film wound on supply reel 240 is the retained trailer, a length of film 256 at least as long as the physical distance traversed by the film from the supply reel to the take-up reel. The trailer provides a means for quickly threading a new film into the system. In use the leading end of the film on the supply reel is attached to the end of the trailer extending from duct 252. Likewise, the other end of the trailer is connectable to the take-up reel. Once attachment is completed, the system is ready to be put into operation.

To operate the overall system a technician or one of the aircraft personnel installs the container holding the supply and take-up reels while the aircraft is on the ground. A mechanical linkage between the reels and a drive motor is completed and electrical connections made. To initially install film in the system the operator inserts a leader on the film into the guide connecting the container to the first projector. The film is then threaded through each of the automatic threading projectors and from the last projector to the take-up reel where it is attached. In the initial installation the leader on the film has sufficient length to extend throughout the system without causing the opening scenes of the film to extend into or beyond the initial projector.

At some subsequent time when the aircraft is aloft, the system is operated by closing the master switch supplying power to the reel and projection station motors. The use of synchronous motors means transport of the film through each projector at the same rate of speed maintaining essentially constant film tension. Malfunction in the system is detected by the film loop forming means and slider arms which initiate corrective action either in the form of restoration of proper film tension or complete shutdown in the event of major problems. Essentially the same procedure is followed after servicing the system.

The trailer is provided at the end of the film. This strand or length of film is extracted from the supply reel at the end of the film presentation and carried through the system to the "end of film" sensor. Detection of the end of the film shuts the system off leaving all projectors prethreaded. The next film to be shown is simply attached to the trailer and the system is ready for operation.

When the film has run through the system and the aircraft has landed, the reel container is removed and a new one inserted for the next flight. It has been found that a given length of film can be run through the system in excess of fifty times without detrimental wear on any part of the film.

From the foregoing, it can be seen that the system is a desirable substitute for the entertainment systems currently being provided in air travel. In addition to use in air travel, other common carriers such as trains and buses can equally well utilize such a system. In addition to passenger-type applications the system is also utilizable in such places as hospitals and sanitariums, where the film is the media for transporting the information between rooms or wards in the institution.

Similarly, a particular utility can be seen for such a system in schools where filmed information of value to all grade levels may be provided simply by inserting the film in a central location as, for example, in an administrative area. The film is then directed through suitable guide means to projectors located in the various classrooms and thence onto succeeding classrooms. The system is advantageous in that the film reel and projector does not need to be transported from classroom to classroom nor is it necessary to assemble the students in an auditorium. In general, the system is applicable wherever it is desired to present information at a number of discrete locations within an enclosure.

What is claimed is:

1. A system for presenting information recorded on film to a plurality of spatially separated audience units comprising:
   a separate projection screen associated with each audience unit and located at spaced intervals corresponding to the spacing of the audience units,
   a source of film,
   a plurality of projectors located at spaced intervals related to the spacing of the screens, each projector having a lens positioned to project images onto at least one screen,
   means for extracting film from the source and for directing the film from the source serially through the plurality of projectors,
   means for sensing a change in the length of film between a pair of projector lenses,
   means for providing corrective action when such change exceeds a predetermined amount, and
   means for gathering the film after it has passed all of the projectors.

2. A system for presenting information recorded on film comprising:
   at least one audience enclosure including audience seating units facing generally in one direction within said enclosure,
   at least two spatially separated film presentation units located within said enclosure and along said direction comprising a projection screen and projector therefor,
   a source of motion picture film,
   means for extracting film from the source and for directing the film from the source serially along said direction through each projector, and
   means for gathering the film after it has passed all of the projectors.

3. A system for displaying information recorded on film comprising:
   a source of motion picture film having visual and corresponding audio information recorded thereon,
a plurality of spaced motion picture projectors,
a plurality of spaced motion picture projection screens for displaying images recorded on the film,
at least one viewing station for receiving the visual information associated with each of the projection screens,
means for extracting the film from the source and for directing the film from the source serially through the several projectors,
means associated with each of the plurality of projectors for presenting the audio information to each viewing station in correspondence with the particular visual information received at that station, and
means for gathering the film after it has passed all of the projectors.

4. A system for presenting material recorded on film to an audience within an elongated enclosed area comprising:
a source of motion picture film,
a plurality of spaced motion picture projectors arranged at spaced intervals substantially throughout the enclosed area in at least two rows parallel to the elongated dimension of the enclosed area,
a plurality of backlighted motion picture projection screens located at spaced intervals within the enclosed area, each of the projection screens being located in close spatial relationship with an associated projector,
at least one audience viewing station associated with each of the projection screens and located in close spatial relationship therewith,
means for extracting film from the source and for projecting images on the film serially at each of the plurality of projectors, and
means for gathering the film after it has passed all of the projectors.

5. A system for presenting material recorded on film to an audience within an enclosed area comprising:
a source of motion picture film,
a plurality of motion picture projectors located at spaced intervals parallelling one dimension of the enclosed area,
a plurality of motion picture projection screens located at spaced intervals within the enclosed area, each of the projection screens being located in close spatial relationship with an associated projector,
at least one audience viewing station associated with each of the projection screens and located in close spatial relationship therewith,
means for extracting film from the source and for directing film from the source serially through the plurality of projectors,
means for gathering the film after it has passed all of the projectors, and
control means for maintaining film tension between projectors during operation under a predetermined limit.

6. A system for presenting motion motion pictures within a viewing enclosure to a plurality of spatially separated viewing locations, comprising:
a source of motion picture film, the film having visual and audio information recorded thereon,
a plurality of motion picture projectors located at spaced intervals within the enclosure,
a separate motion picture projection screen associated with each projector for displaying the visual information recorded on the film,
each projector screen having at least one of the viewing locations associated therewith,
means associated with each of the plurality of projectors for presenting the audio information at each viewing location in synchronism with the visual information projected to the viewing location,
means for extracting the film from the source and for directing the film from the source serially through each of the projectors and audio presentation means, and
means for gathering the film after it has passed all of the projectors.

7. A system for presenting motion picture entertainment within a passenger enclosure comprising:
a source of motion picture film, the film having images and a synchronized sound track recorded thereon,
a plurality of motion picture projectors located at spaced intervals throughout the enclosure,
a plurality of motion picture projection screens located at spaced intervals throughout the enclosure for displaying the film images,
at least one passenger seating location associated with each of the projection screens, each seating location being located in close spatial relationship with its associated screen,
means associated with each of the plurality of projectors for reproducing and distributing the sound track to each passenger seating location in correspondence with the particular images displayed at that location,
means located at each seating location for converting the reproduced sound track into audible sounds,
means for extracting film from the source and for directing the film from the source serially past the projectors, and
means for gathering the film after it has passed the projectors.

8. A system for presenting motion picture entertainment within a passenger enclosure comprising:
a source of motion picture film, the film having images and a corresponding sound track recorded thereon,
a plurality of motion picture projectors located at spaced intervals throughout the enclosure,
a motion picture projection screen located in close spatial relationship with each of the plurality of projectors for displaying the film images,
at least one passenger seating location located in close spatial relationship with each projection screen,
means associated with each of the plurality of projectors for reproducing and distributing the sound track to each passenger seating location in correspondence with the particular images viewed at that location,
means located at each seating location for converting the reproduced sound track into audible sounds,
means for extracting the film from the source and for directing the film from the source serially past the projectors, and
means for gathering the film after it has passed the projectors.

9. A system for presenting motion picture entertainment within a passenger enclosure comprising:
a motion picture film, the film having images and a corresponding sound track recorded thereon,
means for supplying the film to the system,
a plurality of motion picture projectors located at spaced intervals throughout the enclosure,
a motion picture projection screen located in close spatial relationship with each of the plurality of projectors for displaying the film images,
at least one passenger seating location located in close spatial relationship with each projection screen,
means associated with each of the plurality of projectors for reproducing and distributing the sound track to each passenger seating location in correspondence with the particular images displayed at that location,
means located at each seating location for converting the reproduced sound track into audible sounds,
means for driving the film serially past the projectors,
means for gathering the film after it has passed the projectors,
means for defining a film path between each of the projectors and between the first and last projector and the means for supplying and means for gathering the film respectively, and control means for maintaining film tension between projectors during operation under a predetermined limit.

10. A system for presenting motion picture entertainment within a passenger enclosure comprising:
   a source of motion picture film, the film having images and a corresponding sound track recorded thereon,
   a plurality of mechanical intermittence motion picture projectors, and lenses therefor, located at spaced intervals throughout the enclosure,
   a motion picture projection screen associated with each projector for displaying the film images,
   a plurality of passenger seating locations associated with each of the projection screens,
   means associated with each of the projectors for reproducing the sound track,
   means for distributing the reproduced sound track to each of the seating locations associated with the projector in correspondence with the particular images viewed at that location,
   means for extracting the film from the source and for driving the film through the system,
   means for gathering the film after it has passed all of the projectors,
   enclosed guide means for directing the film sequentially from the source through each of the projectors and to the film gathering means,
   means for sensing a change in the length of film between a pair of projector lenses, and
   means for providing corrective action when such change exceeds a predetermined amount.

11. A system for presenting motion picture entertainment within a passenger enclosure comprising:
   a source of motion picture film, the film having images and a corresponding sound track recorded thereon,
   a plurality of optical intermittence motion picture projectors located at spaced intervals throughout the enclosure,
   a motion picture projection screen associated with each projector for displaying the film images,
   a plurality of passenger seating locations associated with each of the projection screens,
   means associated with each of the projectors for reproducing the sound track,
   means for distributing the reproduced sound track to each of the seating locations associated with the projector in correspondence with the particular images viewed at that location,
   means for extracting the film from the source and for driving the film through the system,
   means for gathering the film after it has passed all of the projectors, and
   enclosed guide means for directing the film sequentially from the source through each of the projectors and to the film gathering means.

12. A system for presenting motion picture entertainment within a passenger enclosure comprising:
   a source of motion picture film, the film having images and a corresponding sound track recorded thereon,
   a plurality of motion picture projectors located at spaced intervals throughout the enclosure,
   a plurality of passenger seating locations associated with each projector,
   at least one motion picture projection screen for every nine seating locations for displaying the film images,
   means associated with each of the projectors for reproducing the sound track,
   means for distributing the reproduced sound track to each of the seating locations associated with the projector in correspondence with the particular images viewed at that location,
   means for extracting the film from the source and for driving the film through the system,
   means for gathering the film after it has passed all of the projectors, and
   enclosed guide means for directing the film sequentially from the source through each of the projectors and to the film gathering means.

13. A system for presenting motion picture entertainment within a passenger enclosure comprising:
   a source of motion picture film, the film having a sound track recorded thereon,
   a plurality of spaced motion picture projectors located at fixed intervals throughout an enclosure,
   a motion picture projection station associated with each projector, the projection station including a back-lighted motion picture projection screen for receiving images projected from the film,
   a plurality of fixed viewing locations associated with each of the projection stations,
   means associated with each of the projectors for reproducing sound track,
   means for distributing the reproduced sound track on an individual basis to each of the fixed viewing locations,
   means for extracting film from the source,
   means for guiding film from the source serially through each of the projectors,
   means for gathering the film after it has passed through the projectors, and
   means for driving the film through the system.

14. A system for presenting motion picture entertainment in an elongated passenger vehicle comprising:
   a motion picture film dispensing and receiving location,
   a supply reel of motion picture film, the film having a sound track recorded thereon,
   a take-up reel for the film, the supply and take-up reels being mounted at the film dispensing and receiving location,
   a plurality of spaced motion picture projectors located at fixed intervals throughout the passenger vehicle,
   a motion picture projection station associated with each projector, the projection station including a back-lighted screen for receiving images projected from the film,
   a plurality of passenger seating locations associated with each of the projection stations,
   means associated with each of the projectors for reproducing the sound track,
   means for distributing the reproduced sound track on an individual basis to each of the passenger seating locations associated with the sound track reproducing means,
   means for extracting film from the supply reel,
   means for directing the film from the supply reel serially through each of the projectors to the take-up reel, and
   means for driving the supply and take-up reels and each of the projectors.

15. A system according to claim 14 including a strand of material having a length at least as long as the physical distance from the supply reel through each of the projectors to the take-up reel wound on the supply reel interiorly of the film.

16. A system according to claim 14 including means for maintaining substantially constant tension on the film.

17. A systesm according to claim 14 including means for sensing the passage of the end of the film from the last projector in the system.

18. A system for presenting motion picture entertainment in an airplane cabin comprising:
   a source of motion picture film,
   a sound recording for use in conjunction with the film,
   means for supplying the film to the system,
   means for receiving the film from the system,
   a plurality of motion picture projectors located at spaced intervals within the airplane cabin intermediate the film supply and receiving means, a projection station associated with each projector, the station including a screen for receiving images projected from the film, at least one passenger seating location associated with each projector and station, means for reproducing the sound recording, means for distributing the reproduced sound recording on an individual basis to each of the passenger seating locations such that the recording is in synchronisms with the images on the screen associated with the seating location, enclosed duct means for guiding the film between the supplying means, the projectors, and the receiving means, and synchronous drive means for driving the film from the supply means past each of the projectors to the receiving means.

19. A system according to claim 18 including control means for sensing the length of the film between projectors and for maintaining the length of the film between projectors within predetermined limits.

20. A system according to claim 18 including means for disengaging the drive means from each projector individually.

21. A system according to claim 19 wherein the control means includes means for stopping the drive means when the film length between projectors deviates beyond the predetermined limits by a predetermined amount.

22. An airplane cabin motion picture entertainment system comprising:

a container having a supply reel and a take-up reel, a motion picture film having a sound track recorded thereon, at least two rows of motion picture projectors, the projectors in each row being located at spaced intervals relative to adjacent projectors in that row, each projector defining a predetermined film path through the projector, enclosed film guards interconnecting the container and the motion picture projectors for guiding the film between the projectors and the supply and take-up reels, sound track reproducing means associated with each of the motion picture projectors for reproducing the sound track recorded on the film, synchronous electrical motors associated with each of the motion picture projectors for driving the film from the supply reel through the plurality of projection stations to the take-up reel, a plurality of motion picture projection screens, means for directing the subject matter recorded on the film onto a screen, servo control means associated with each of the motion picture projectors for maintaining a predetermined length of film between projectors, at least one passenger seat associated with each of the screens, and means for distributing the reproduced sound track to each of the passenger seats on an individual basis.

23. A system according to claim 1 including means for reversing the direction of said film.

24. A system according to claim 3 including means for the film to by-pass each projector.

25. A system according to claim 1 including means for sensing the coincidence of a point on the film and a predetermined point in the system and means for stopping the film in response thereto.

26. A system according to claim 22 wherein the sound track is an optical recording and the sound track reproducing means includes:

a source of light, and photosensitive means for detecting light passed from the source through the sound track recorded on the film.

27. A system according to claim 22 wherein the sound track is magnetically recorded on the film and the sound track reproducing means is a magnetic transducer.

28. An airplane cabin entertainment system comprising:

a storage compartment, a container having a supply reel and a take-up reel, means for mounting the container in the compartment, a supply of motion picture film located between the supply reel and take-up reel, the film having a sound track recorded thereon, a plurality of automatic threading motion picture projectors located at spaced intervals throughout the airplane cabin for projecting images recorded on the film as the film is carried through each projector, each projector having a projection lamp, three-phase synchronous electrical motors for driving the film through the system from the supply reel through the projectors to the take-up reel, a plurality of projection screens, the number of screens corresponding to the number of projectors, means for directing the projected images to a screen, control means associated with each of the projectors for sensing the length of film between each projector and for providing corrective action when the length becomes abnormal, means for reproducing the sound track recorded on the film, means for distributing the reproduced sound track to each of the seating locations in synchronism with the images projected on the screen associated with the seating location, auxiliary sound reproduction means connected to the sound distribution means for transmitting material other than the sound track recorded on the film to the seating locations, an auxiliary strand attached to the motion picture film and located intermediate the film and the supply reel, the strand being adapted to be threaded into the system at the end of a presentation, and enclosed film guides interconnecting the storage compartment and the individual projectors for guiding the film in its transit through the system.

29. A system according to claim 1 wherein the means for providing corrective action includes:

mechanical means for forming a loop in the film, means for locating the loop forming means at an operating position, and electrical switch means for detecting a change in the position of the loop forming means.

30. A system according to claim 1 wherein the means for providing corrective action includes:

means for forming a loop in the film, a light source located on one side of the film loop, and photosensitive means on the side of the film opposite the light source for detecting interruptions of light from the source by the film loop.

31. A system according to claim 1 wherein the means for providing corrective action comprises:

spring-loaded means associated with each of the motion picture projectors for forming a loop in the film, the loop forming means being adapted to be held under tension by the film in the operating mode, means associated with the loop forming means for sensing the length of the film loop, means for stopping the projector with which the loop forming means is associated when the length of the film loop increases by a predetermined amount, and means for stopping the next succeeding projector when the length of the film loop decreases by a predetermined amount.

32. A system according to claim 31 including means for de-energizing the projection lamp when the projector stopping means is operated.

33. A system according to claim 2 including:
a sound track recorded on the film in correspondence with the information recorded thereon,
means for reproducing the sound track,
means for distributing the reproduced sound track to each audience unit in correspondence with the particular visual information projected to that unit, and
alternately selectable means for distributing sound to each audience unit from the projector located immediately forward of the projector associated with that audience unit.

34. An airplane cabin entertainment system comprising:
a storage compartment,
a container having a supply reel and a take-up reel,
means for mounting the container in the compartment,
a supply of motion picture film located between the supply reel and the take-up reel, the film having a sound track recorded thereon,
a plurality of automatic threading motion picture projectors located at spaced intervals throughout the airplane cabin for projecting images recorded on the film as the film is carried through each projector, each projector having a projection lamp,
three-phase synchronous electrical motors for driving the film from the supply reel through the projectors to the take-up reel,
a plurality of retractable backlighted projection screens, the number of screens corresponding to the number of projectors,
means for de-energizing the projection lamp associated with a particular screen when the screen is retracted,
means for directing the projected images to the backlighted screen,
control means associated with each of the projectors for sensing the length of film between projectors and for providing corrective action when the length changes by a predetermined amount,
means for reproducing the sound track recorded on the film,
means for distributing the reproduced sound track to each of the seating locations in synchronism with the images projected on the screen associated with the seating location, and
enclosed film guides interconnecting the storage compartment and the individual projectors for guiding the film in its transit through the system.

35. A method of presenting audio and visual information recorded on film to a plurality of spatially separated audience units comprising the steps of:
(1) providing the film at a supply position,
(2) threading the film from the supply serially through a plurality of display stations located at spaced intervals corresponding to the spacing of the audience units to a take-up position,
(3) withdrawing the film from the supply position and driving it through the plurality of display stations,
(4) displaying the visual information recorded on the film at the plurality of stations as the film passes through the stations, and
(5) presenting the audio information to each audience unit in synchronism with the visual information displayed at that unit.

36. A method of displaying information recorded on motion picture film in a passenger enclosure comprising the steps of:
(1) providing the film at a supply position,
(2) threading the film from the supply serially through a plurality of motion picture projectors located at spaced intervals within the enclosure,
(3) selectively energizing the plurality of projectors,
(4) driving the film from the supply position past the projectors to the take-up position,
(5) projecting the information recorded on the film to a plurality of projection screens to provide a simultaneous and serial display of the information recorded on the film as it passes through the energized stations, and
(6) gathering the film at the take-up positions.

37. A method of displaying information recorded on motion picture film in an airplane cabin comprising the steps of:
(1) unreeling the film from a supply position,
(2) driving the film at a constant speed from the supply through enclosed duct and a plurality of motion picture projectors located at spaced intervals throughout the cabin to a take-up position,
(3) selectively energizing the projectors and directing light through the film to backlight a projection screen located in close spatial relationship with each projector,
(4) measuring the length of film between projectors,
(5) controlling the film speed through each projector to maintain a predetermined length of film between projectors, and
(6) reeling the film after it has passed the last of the plurality of the projectors.

38. A system according to claim 2 wherein the film has a trailer at a rear end portion thereof, the trailer being adapted to be retained in the system.

39. A system for presenting information recorded on film comprising:
at least two distinct audience units located within an enclosure, said units facing generally in the same direction and having a predetermined length along said direction,
a separate projection screen associated with each audience unit,
a source of motion picture film,
a projector associaed with each screen, the distance between said projector and its associated screen being less than said length,
means for extracting film from the source,
means for transporting the film from the source serially through each projector, and
means for gathering the film after it has passed the projectors.

40. A system for presenting visual information recorded on motion picture film and synchronized audio accompaniment therefor, including at least two film projection screens to display images projected thereon oriented generally in the same direction within an audience enclosure, at least one point within the enclosure having lines of sight to at least two of the screens comprising:
a separate motion picture film projector associated with each screen,
means for serially delivering the film to the projectors, and
audio distribution means for delivery of the audio accompaniment within the enclosure, including means for restricting the accompaniment delivered to said one point to that corresponding only, at any given time, with the visual information presented at one screen.

References Cited
UNITED STATES PATENTS

| | | | |
|---|---|---|---|
| 1,188,114 | 6/1916 | Thomas | 352—161 |
| 1,307,323 | 6/1919 | Stein | 352—36 |
| 1,347,103 | 7/1920 | Killman | 352—70 |
| 1,392,475 | 10/1921 | Bingham | 352—70 |
| 1,543,892 | 6/1925 | Willard | 88—24 |
| 1,655,297 | 1/1928 | Thornton | 352—235 |
| 1,681,723 | 8/1928 | Clas | 352—134 |
| 1,843,972 | 2/1932 | De Forest | 352—31 |

(Other references on following page)

| UNITED STATES PATENTS | | | | FOREIGN PATENTS | | |
|---|---|---|---|---|---|---|
| 1,877,731 | 9/1932 | Kuchenumeister | 352—1 | 18,072 | 1912 | Great Britain. |
| 1,942,748 | 1/1934 | De Ybarrondo | 352—6 | 621,885 | 2/1927 | France. |
| 2,058,179 | 10/1936 | Rommert. | | 924,517 | 3/1947 | France. |
| 2,483,040 | 9/1949 | El-Mazzaoui | 352—6 | | | |
| 3,200,408 | 8/1965 | Mordin | 352—14 | | | |

JULIA E. COINER, *Primary Examiner.*